Patented Oct. 26, 1948

2,452,188

UNITED STATES PATENT OFFICE 2,452,188

METHYLENEDIOXYPHENYL COMPOUND AS INSECTICIDE AND PYRETHRIN SYNERGIST

Oscar F. Hedenburg, Pittsburgh, Pa., assignor, by mesne assignments, to Harold W. Moburg, Toledo, Ohio No Drawing. Application February 27, 1943, Serial No. 477,444

6 Claims. (Cl. 167—33)

This invention relates to insecticides and synergists for insecticides and the preparation thereof. The objects in view are to bring to the field of industrial availability new compositions of matter for the purposes indicated.

It is already known of sesame oil (Eagleson, 2,202,145) that, ineffective of itself alone, it is very effective as a synergist, to increase the toxic action of pyrethrin and rotenone as insecticides. This discovery led to investigation, by which it was found that sesamin, a substance separable from sesame oil as a crystalline solid, was the effective component to the end named. Other substances, related to sesamin in that they contain the piperonyl group,

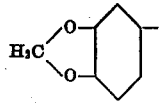

were then tested, and it was found (Haller, La Forge, and Sullivan, Jour. Organic Chemistry, Mar. 1942; VII, 183,185) that, while certain substances most closely related to sesamin (isosesamin and asarinin) were of like effect, other substances, and particularly piperonal, safrol, and ethyl piperonylate, were ineffective.

I began in 1935 my investigation on insecticides of substances that contain the piperonyl group. In 1935 I made derivatives of safrol with cresols that contained the piperonyl group. These substances were tested, not for their synergistic effect when compounded with other toxic substances, but for their effect, in and of themselves. They were tested by dissolving them in kerosene and evaluating them by the Peet-Grady method in their effect upon houseflies, Musca domestica. One of these substances, in a 1.40% solution, gave an 86% knockdown and a 50% kill—50%, that is to say, of the flies used in the test; another of these substances that I then prepared, in a 1.25% solution, gave 69% knockdown and 24% kill. At that time I was in search of compounds to take the place of pyrethrum; I was not in search of synergists; and my investigations showed that these safrol compounds (containing the piperonyl group) were, in and of themselves, insecticides. It was only at a subsequent time that (having preserved specimens, as I habitually do, of these first preparations) I tested them in combination with pyrethrum, and found them to have synergistic value.

In the Peet-Grady test the control is the official test insecticide of the National Association of Insecticide and Disinfectant Manufacturers. It contains about 100 mg. of pyrethrins 1 and 2 per 100 c. c. It is the standard used in the industry for making comparative tests. It is commonly spoken of, and I shall herein speak of it, as O. T. I.

No. 241

In June, 1942, I formed a compound by the reaction at low temperature and in the presence of sodium hydroxide as a catalyst of piperonal and methyl heptenone, according to the equation—

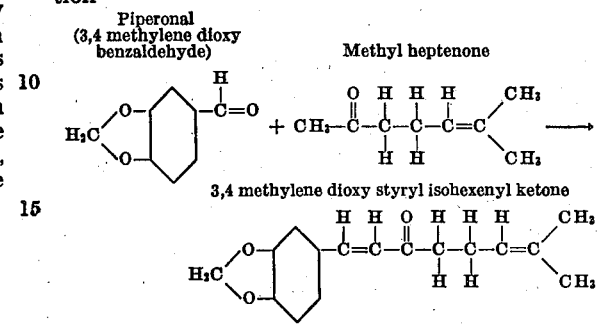

This product I have designated No. 241. Tests upon it, as already described, gave the following results:

| Composition | Knockdown | Kill | Ratio, kill to knockdown |
|---|---|---|---|
|  | Per cent | Per cent | Per cent |
| 1% No. 241 50 mg. pyr. 1 and 2 | 98.0 | 85.2 | 87 |
| O. T. I | 96.7 | 63.2 | 65 |

No. 242

Piperonal was reacted with methyl isobutyl ketone at low temperature and in the presence of sodium hydroxide, according to the equation—

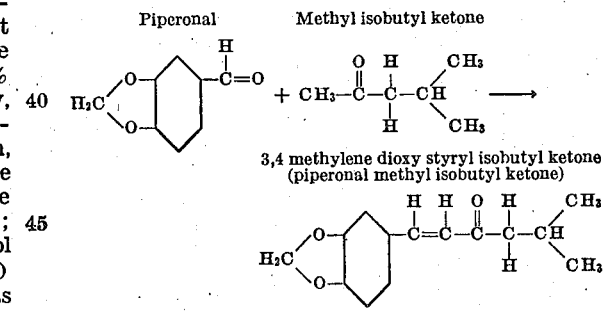

This substance, identified as No. 242, under test, gave the following results:

| Composition | Knockdown | Kill | Ratio, kill to knockdown |
|---|---|---|---|
|  | Per cent | Per cent | Per cent |
| 1% No. 242 50 mg. pyr. 1 and 2 | 97.6 | 71.7 | 73 |
| O. T. I | 96.7 | 63.2 | 65 |

No. 267

I reacted piperonal and methyl hexyl ketone at low temperature in the presence of sodium hydroxide, according to the equation—

Piperonal + Methyl hexyl ketone → 3,4 methylene dioxy styryl hexyl ketone (piperonal methyl hexyl ketone)

This compound I designated No. 267. Under test it showed—

| Composition | Knockdown | Kill | Ratio, kill to knockdown |
|---|---|---|---|
|  | Per cent | Per cent | Per cent |
| 0.5% No. 267<br>40 mg. pyr. 1 and 2 | 99.9 | 86 | 86 |
| O. T. I | 99.7 | 66.2 | 66 |

All of the products whose preparation and quality have been specified have a molecular weight of at least 190, and are responsive to the formula—

$$R-\overset{H}{\underset{|}{C}}=\overset{R_1}{\underset{|}{C}}-\overset{O}{\underset{\|}{C}}-R_2$$

in which R stands for piperonyl (methylene dioxy phenyl).

$R_1$ stands for hydrogen, and $R_2$ stands for hydrogen, alkyl, aryl, aralkyl, or an alicyclic or heterocyclic group. And the same carbon ring may satisfy both of the terms $R_1$ and $R_2$, united to the several carbon atoms by different linkages.

Thus, in the foregoing formula, which represents the general formula for the type of compound forming the principal group of the compounds of the present invention, R specifically may be the piperonyl group, $R_1$ may be hydrogen, and $R_2$ may be a group consisting of hydrogen, alkyl, aryl, aralkyl, alicyclic, and an heterocyclic group, which groups may then be designated by R, the general formula noted above, then becomes I have found no substance responsive to this general formula that is not serviceable to the end in view, and I believe all substances responsive to the formula to be so serviceable. All are insecticides, especially when combined with pyrethrins, they act synergistically.

The products of my invention, when used in intended manner, I believe to be innocuous to human beings; they are tasteless and almost odorless; they sting neither the eyes nor the nose of the user.

I claim as my invention:

1. An insecticide and synergist for a pyrethrin insecticide having the general formula $$R-\overset{H}{\underset{|}{C}}=\overset{H}{\underset{|}{C}}-\overset{O}{\underset{\|}{C}}-R_2$$

in which R is the 3,4-methylenedioxyphenyl radical and $R_2$ is a substituent selected from the group consisting of the hydrogen atom and alkyl, aryl, aralkyl, alicyclic and heterocyclic radicals.

2. An insecticide comprising a compound having the general formula $$R-\overset{H}{\underset{|}{C}}=\overset{H}{\underset{|}{C}}-\overset{O}{\underset{\|}{C}}-R_2$$

in which R is the 3,4-methylenedioxyphenyl radical and $R_2$ is a substituent selected from the group consisting of the hydrogen atom and alkyl, aryl, aralkyl, alicyclic and heterocyclic radicals, the said compound having a molecular weight of at least 190, and a readily vaporizable vehicle therefor.

3. The compound having the structural formula $$R-\overset{H}{\underset{|}{C}}=\overset{H}{\underset{|}{C}}-\overset{O}{\underset{\|}{C}}-R_2$$

in which R is the 3,4-methylenedioxyphenyl radical and $R_2$ is the n-hexyl radical.

4. An insecticide composition containing pyrethrins and as a synergist therefor a compound having the generic formula $$R-\overset{H}{\underset{|}{C}}=\overset{H}{\underset{|}{C}}-\overset{O}{\underset{\|}{C}}-R_2$$

in which R is the 3,4-methylenedioxyphenyl radical and $R_2$ is a substituent selected from the group consisting of the hydrogen atom and alkyl, aryl, aralkyl, alicyclic and heterocyclic radicals.

5. An insecticide composition containing pyrethrins and as a synergist therefor the compound of the formula $$R-\overset{H}{\underset{|}{C}}=\overset{H}{\underset{|}{C}}-\overset{O}{\underset{\|}{C}}-R_2$$

in which R is the 3,4-methylenedioxyphenyl radical and $R_2$ is the n-hexyl radical.

6. An insecticide composition containing pyrethrins and as a synergist therefor the compound of the formula $$R-\overset{H}{\underset{|}{C}}=\overset{H}{\underset{|}{C}}-\overset{O}{\underset{\|}{C}}-R_2$$

in which R is the 3,4-methylenedioxyphenyl radical and $R_2$ is the n-hexyl radical, the pyrethrins and synergist compound being contained in a readily vaporizable liquid vehicle.

OSCAR F. HEDENBURG.

REFERENCES CITED

The following references are of record in the file of this patent:

UNITED STATES PATENTS

| Number | Name | Date |
|---|---|---|
| 2,051,807 | Allen | Aug. 25, 1936 |
| 2,326,350 | Gertler et al. | Aug. 10, 1943 |

OTHER REFERENCES

Chem. Abst., vol. 25 (1931), page 5411, citing: Berichte, vol. 64B, pages 1909–10 (1931).

Chem. Abst., vol. 19, page 467.

McIndoo, Dept. Bulletin No. 1201 (U. S. Dept. of Agriculture), published Mar. 19, 1924.